(12) United States Patent
Bland et al.

(10) Patent No.: US 6,406,344 B1
(45) Date of Patent: Jun. 18, 2002

(54) MARINE EXHAUST WITH DUAL COOLING

(75) Inventors: Gerald F. Bland, Glenview, IL (US); James V. Bellantonio, Kenosha, WI (US); Gerald F. Neisen, Rockport, TX (US)

(73) Assignee: Bombardier Motor Corporation of America, Grant, FL (US)

( * ) Notice: Subject to any disclaimer, the term of this patent is extended or adjusted under 35 U.S.C. 154(b) by 0 days.

(21) Appl. No.: 09/585,477

(22) Filed: Jun. 1, 2000

(51) Int. Cl.[7] .............................................. B63H 21/10
(52) U.S. Cl. ...................................................... 440/88
(58) Field of Search ................. 440/88, 89; 60/310–324

(56) References Cited

U.S. PATENT DOCUMENTS

| | | | |
|---|---|---|---|
| 2,462,450 A | * 2/1949 | Wilson .......................... | 440/88 |
| 2,935,039 A | * 5/1960 | Thompson ..................... | 440/89 |
| 3,169,365 A | * 2/1965 | Benjamen ..................... | 60/321 |
| 3,240,181 A | * 3/1966 | Chandler et al. .............. | 440/78 |
| 3,296,997 A | * 1/1967 | Hoiby et al. .................. | 440/88 |
| RE26,400 E | * 6/1968 | Jasper ........................ | 123/41.08 |
| 3,556,041 A | 1/1971 | Shimanckas | |
| 3,664,135 A | 5/1972 | Lirette | |
| 3,780,712 A | * 12/1973 | Pace ........................ | 123/41.08 |
| 4,184,566 A | * 1/1980 | Baker et al. ................. | 181/261 |
| 4,504,238 A | 3/1985 | Neisen | |
| 4,787,328 A | * 11/1988 | Inoue ......................... | 114/183 R |
| 4,799,905 A | 1/1989 | Broughton et al. | |
| 4,831,822 A | * 5/1989 | Yoshimura ..................... | 60/310 |
| 4,840,589 A | * 6/1989 | Breaux ......................... | 440/89 |
| 4,900,282 A | 2/1990 | Takahashi et al. | |
| 4,917,640 A | 4/1990 | Miles, Jr. | |
| 4,983,135 A | 1/1991 | Boda et al. | |
| 4,991,546 A | * 2/1991 | Yoshimura ................. | 123/41.31 |
| 5,016,439 A | * 5/1991 | Nitta ............................ | 60/310 |
| 5,112,260 A | 5/1992 | Bland et al. | |
| 5,118,316 A | 6/1992 | Kakizaki et al. | |
| 5,161,372 A | 11/1992 | Whipple | |
| 5,295,881 A | 3/1994 | Breckenfeld et al. | |
| 5,366,401 A | 11/1994 | Nanami et al. | |
| 5,425,232 A | 6/1995 | Holtermann | |
| 5,501,624 A | 3/1996 | Matsumoto et al. | |
| 5,625,173 A | * 4/1997 | Woods ........................ | 181/227 |
| 5,700,172 A | 12/1997 | Ousley, II et al. | |
| 5,746,054 A | * 5/1998 | Matte ........................... | 60/310 |
| 5,788,547 A | * 8/1998 | Ozawa et al. ................. | 440/89 |
| 5,980,344 A | * 11/1999 | Widmann ..................... | 440/89 |
| 5,983,633 A | * 11/1999 | Woleslagle et al. ........... | 60/312 |
| 6,026,641 A | * 2/2000 | Liberty ........................ | 60/314 |

FOREIGN PATENT DOCUMENTS

| | | | | |
|---|---|---|---|---|
| JP | 58-190512 | * 11/1983 | .................. | 440/88 |
| JP | 4-134123 | * 5/1992 | .................. | 440/89 |
| JP | 9-041966 | * 2/1997 | .................. | 440/88 |
| JP | 9-303145 | * 11/1997 | .................. | 440/88 |

* cited by examiner

Primary Examiner—S. Joseph Morano
Assistant Examiner—Ajay Vasudeva
(74) Attorney, Agent, or Firm—Timothy J. Ziolkowski; Cook & Franke SC

(57) ABSTRACT

A watercraft (10) having two sources of (22, 32) of cooling water (28, 34) for injection cooling of hot exhaust gas (30) being conveyed through an exhaust pipe (16) upstream of muffler (54). The first water source (22) may be an active apparatus such as the engine cooling apparatus (22). The second source of water (32) may be a passive apparatus such as a Pitot tube (38) formed in the stern drive (20) of the watercraft (10). By providing two independent sources of cooling water, the probability of exhaust component failures is significantly reduced.

41 Claims, 1 Drawing Sheet

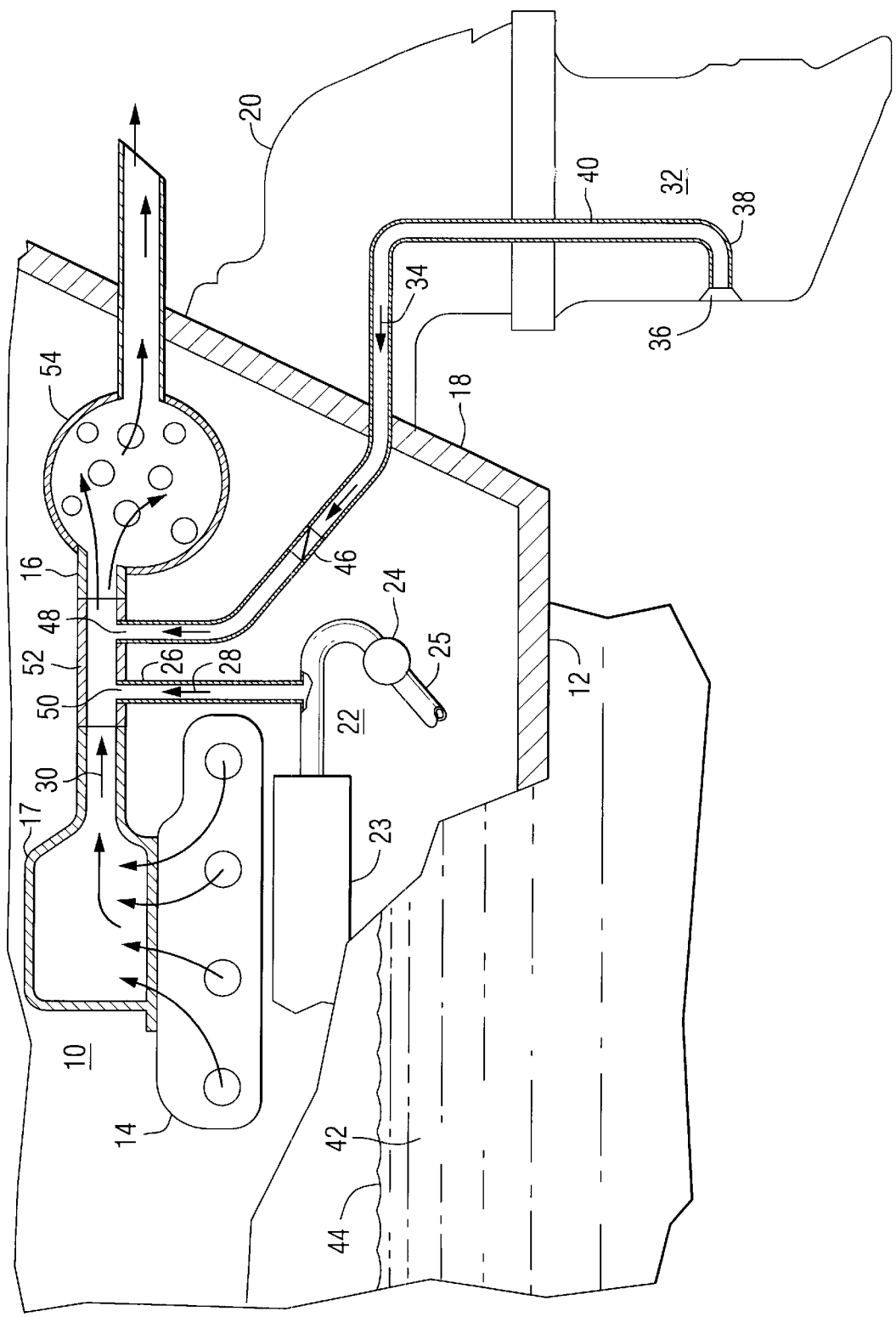

MARINE EXHAUST WITH DUAL COOLING

BRIEF DESCRIPTION OF THE DRAWINGS

The features and advantages of the present invention will become apparent from the following detailed description of the invention when read with the accompanying drawing in which a watercraft is illustrated as having an exhaust pipe having connections to a first supply of water and to a second supply of water.

DETAILED DESCRIPTION OF THE INVENTION

The FIGURE illustrates a watercraft 10 having a hull 12 with an internal combustion engine 14 disposed within the hull. The engine 14 has an exhaust pipe 16 passing through a transom 18 to the exterior of the hull 12. The engine 14 is connected to a stern drive 20 as is known in the art of inboard/outboard marine craft. Although illustrated herein as embodied as an inboard/outboard powered watercraft, the present invention may be embodied in any style of watercraft, including inboard, outboard and inboard/outboard applications.

Watercraft 10 is equipped with an engine cooling apparatus 22 which includes a pump 24 and associated water jacket 23 and piping 25. Engine cooling apparatus 22 is operable to draw water from a body of water 42 exterior to the hull 12, to circulate the water through various engine cooling passages (not shown) and water jacket 23 to remove heat from the engine 14, and to return the heated water to the exterior of hull 12. Engine cooling apparatus 22 is an active apparatus in the sense that pump 24 provides the motive force for the circulation of coolant through the cooling apparatus 22. As used herein, the term "active apparatus" is meant to include only those components or collection of components which generate their own movement to accomplish their intended design function. Engine cooling apparatus 22 is an active apparatus because pump 24 must be operated in order to circulate coolant there through. As used herein, the term "passive apparatus" is meant to include only those components or groups of components which can perform their intended design function without self generated motion. In addition to providing an engine cooling function, engine cooling apparatus 22 is connected to the exhaust pipe 16 by a first fluid connection such as conduit 26. Conduit 26 is operable to direct a first flow of water 28 from the engine cooling apparatus 22 into exhaust pipe 16 to cool exhaust gas 30 and downstream portions of pipe 16.

The FIGURE also illustrates an auxiliary water supply 32 operable to provide a second flow of water 34 into the exhaust pipe 16 upstream of muffler 54. As illustrated in the figure, the auxiliary water supply 32 includes a tube 38 having a funnel shaped opening 36 disposed on a forward facing surface of the stern drive 20. As the watercraft 10 is moved forward through body of water 42, tube 38 functions as a Pitot tube operable to force water through conduit 40 and into exhaust pipe 16. The auxiliary water supply 32 is a passive apparatus since its functioning to deliver cooling water 34 to exhaust pipe 16 does not require the self generated movement of any of the components of the water supply 32. The second flow of water 34 augments the cooling capability of the first flow of water 28 to further reduce the temperature of the exhaust gas 30. Opening 36 is preferably funnel shaped in order to increase the flow of water through conduit 40 as the watercraft is moved through the body of water 42. One may appreciate that the opening 36 of tube 38 may be disposed on any forward facing surface of watercraft 10 as long as it is located at a point below the water line 44 during the operation of the watercraft 10. In order to prevent exhaust gas from flowing out of opening 36 when engine 14 is running but watercraft 10 is stationary or moving very slowly, a check valve 46 may be connected in conduit 40 in order to pass fluid flowing into the exhaust pipe 16 but to block fluid from flowing out of exhaust pipe 16 into tube 38. In order to further increase the volume of the second flow of water 34, a plurality of openings 36 may be provided at different locations on the exterior of watercraft 10 below waterline 44. It is desirable that the connections of both conduit 26 and conduit 40 are located on an upstream portion of exhaust pipe 16 in order to minimize the uncooled length of exhaust pipe 16. In one embodiment the outlet 48 of conduit 40 is disposed on the exhaust pipe 16 at a location proximate the outlet 50 of the conduit 26. Such proximate locations may include, for example, the outlets 48, 50 being located on a single flanged insert 52 which is adapted to be installed as part of exhaust pipe 16. By using such an insert 52, one can envisioned the auxiliary water supply 32 being installed as a back-fit kit on an existing watercraft that is already equipped with a connection between the engine water jacket 23 and the exhaust pipe 16.

A method of cooling the exhaust pipe 16 of a watercraft 10 includes the steps of directing a first flow of water 28 from an engine cooling apparatus 22 into the exhaust pipe 16 of an engine 14. A second flow of water 34 may then be. directed from an auxiliary water supply 32 into the exhaust pipe 16. The means for directing the second flow of water 34, such as auxiliary water supply 32, is preferable a passive apparatus which is operable independent of the means for directing the first flow of water 28, such as engine cooling apparatus 22. By disposing the inlet end 36 of a conduit 40 below a waterline 44 of the watercraft 10, a flow of water 34 will be forced through conduit 40 as the watercraft 10 is moved through a body of water 42. Thus even upon failure of an engine cooling apparatus 22, a continued source of cooling water 34 will be supplied to exhaust pipe 16, thereby preventing damage to the exhaust pipe 16 and associated downstream components such as muffler 54. Furthermore, the risk of injury to an occupant of the watercraft 10 during periods of continued engine operation following the failure of cooling apparatus 22 is significantly reduced.

In one embodiment, engine coolant apparatus 22 may be designed to provide a flow rate of 30 gpm of water through conduit 26 into exhaust pipe 16 at full throttle operation. With no other cooling flow,this amount of water will cool the. exhaust gas from approximately 1,400 degrees Fahrenheit to 160 degrees Fahrenheit. Auxiliary water supply 32 may be designed to provide a flow rate of 10 gpm of water through conduit 40 into exhaust pipe 16 at full throttle speed. With no cooling flow 28 from the engine cooling apparatus 22, this auxiliary water supply 32 will cool the exhaust gas to approximately 200 degrees Fahreheit, which is sufficiently low to protect downstream components such as muffler 54. With both systems operating, the exhaust gas will be cooled to approximately 130 degrees Fahrenheit. While less than optimal for long term operation of engine 12, the flow of cooling water 34 provided by the auxiliary source of cooling water 32 is adequate to prevent component damage and dangerously high exhaust pipe temperatures for short periods of operation of engine 12 without exhaust cooling flow 26. A higher flow rate may be provided through the auxiliary water supply 32 by increasing the size of the conduit 40, and the specific component sizes and resulting temperatures may be selected on an application specific basis using analytical or empirical techniques known in the art.

While the preferred embodiments of the present invention have been shown and described herein, it will be obvious that such embodiments are provided by way of example only. Numerous variations, changes and substitutions will occur to those of skill in the art without departing from the invention herein. Accordingly it is intended that the invention be limited only by the spirit and scope of the appended claims.

What is claimed is:

1. A watercraft comprising:
    a hull;
    an engine disposed within the hull;
    an exhaust pipe attached to an exhaust manifold of the engine;
    a muffler attached to the exhaust pipe;
    an engine cooling apparatus;
    a first fluid connection between the engine cooling apparatus and the exhaust pipe for directing a first flow of water into the exhaust pipe upstream of the muffler;
    an auxiliary water supply;
    a second fluid connection between the auxiliary water supply and the exhaust pipe for directing a second flow of water into the exhaust pipe upstream of the muffler, wherein the second flow is passively driven and independent of the first flow.

2. The watercraft of claim 1, wherein the first fluid connection and the second fluid connection comprise an insert attached between the exhaust manifold and the exhaust pipe.

3. The watercraft of claim 1, wherein the auxiliary water supply further consists of a passive apparatus.

4. The watercraft of claim 1, wherein the auxiliary water supply further comprises a conduit having an opening disposed exterior to the hull below a water line.

5. The watercraft of claim 4, wherein the opening comprises a funnel shape.

6. The watercraft of claim 1, wherein the auxiliary water supply further comprises an opening formed in a forward facing exterior surface of the watercraft disposed below a water line.

7. The watercraft of claim 1, further comprising a check valve connected in the second fluid connection and operable to pass fluid flowing into the exhaust pipe and to block fluid flowing out of the exhaust pipe.

8. The watercraft of claim 1, further comprising:
    a stern drive apparatus connected to the engine and extending below an exterior bottom surface of the hull;
    and wherein the auxiliary water supply further comprises an opening formed in a forward facing surface of the stern drive apparatus at a point exterior to the hull and below a water line.

9. An exhaust apparatus for a watercraft, the exhaust apparatus comprising:
    an exhaust pipe connected to an engine exhaust manifold for conveying exhaust gas away from an engine;
    a muffler attached to the exhaust pipe;
    a first supply of water connected to the exhaust pipe for providing a first flow of water into the exhaust pipe upstream of the muffler from an active apparatus; and
    a second supply of water connected to the exhaust pipe for providing a second flow of water into the exhaust pipe upstream of the muffler from a passive apparatus not associated with the active apparatus.

10. The exhaust apparatus of claim 9, wherein the exhaust pipe further comprises an insert, and wherein the first supply of water and the second supply of water are connected to the insert.

11. The exhaust apparatus of claim 9, wherein the first supply of water comprises a water pump and the second supply of water comprises a Pitot tube.

12. The exhaust apparatus of claim 9, wherein the first supply of water comprises a water pump and the second supply of water comprises an opening formed below a water line in a forward facing exterior surface of the watercraft.

13. The exhaust apparatus of claim 12, wherein the opening comprises a funnel shape.

14. A cooling apparatus for an exhaust apparatus of a watercraft, the exhaust apparatus having an exhaust pipe connected on an upstream side to an exhaust manifold of an engine of the watercraft and connected on a downstream side to a muffler, the cooling apparatus comprising:
    a first supply of water having an outlet connected to the exhaust pipe proximate the upstream side and driven by an active apparatus; and
    a second supply of water having an outlet connected to the exhaust pipe proximate the upstream side, and driven by a passive apparatus, independent of the active apparatus.

15. The cooling apparatus of claim 14, wherein the exhaust pipe further comprises an insert, and wherein the outlet of the first supply of water and the outlet of the second supply of water are connected to the insert.

16. The cooling apparatus of claim 14, wherein the first supply of water comprises a pump.

17. The cooling apparatus of claim 16, wherein the second supply of water comprises a conduit having an inlet end adapted to be disposed exterior to a watercraft below a water line and having an outlet end connected to the exhaust pipe.

18. The cooling apparatus of claim 17, wherein the inlet end comprises a funnel shape.

19. The cooling apparatus of claim 14, wherein the second supply of water comprises a check valve.

20. The cooling apparatus of claim 14, wherein the outlet of the second supply of water is disposed on the exhaust pipe proximate the outlet of the first supply of water.

21. A cooling apparatus for a watercraft, the cooling apparatus comprising:
    a first means for directing water through an engine of the watercraft and into an exhaust pipe; and
    a second means, independent of the first means, for directing water from an exterior of the watercraft directly into the exhaust pipe upstream of a muffler.

22. The cooling apparatus of claim 21, wherein the first means comprises a pump and the second means consists of a passive apparatus.

23. The cooling apparatus of claim 21, wherein the first means comprises an active apparatus and the second means consists of a passive apparatus.

24. A method of cooling an exhaust apparatus of a watercraft, the watercraft having an engine cooling apparatus, the method comprising the steps of:
    directing a first flow of water from the engine cooling apparatus into the exhaust apparatus upstream of a muffler; and
    directing a second flow of water from a water source other than the engine cooling apparatus into the exhaust apparatus upstream of the muffler.

25. The method of claim 24, further comprising the steps of:
    providing an insert in the exhaust apparatus upstream of the muffler;
    connecting the engine cooling apparatus to the insert; and
    connecting the water source other than the engine cooling apparatus to the insert.

26. The method of claim 24, wherein the step of directing a second flow of water comprises the steps of:

disposing an inlet end of a conduit exterior to the watercraft below a water line;

connecting an outlet end of the conduit to the exhaust apparatus upstream of the muffler; and forcing water through the conduit and into the exhaust pipe by moving the watercraft through a body of water.

27. The method of claim 26, wherein the step of disposing an inlet end of a conduit further comprises disposing the inlet end on a forward facing surface of a stern drive of the watercraft.

28. The method of claim 27, further comprising the step of providing a funnel shaped opening on the inlet end.

29. The method of claim 27, wherein the step of disposing an inlet end of a conduit further comprises disposing the inlet end proximate a hole formed in a forward facing surface of the watercraft below a water line.

30. A method of cooling an exhaust pipe and muffler of a watercraft, the watercraft having an engine cooling apparatus, the method comprising the steps of:

directing a first flow of water from the engine cooling apparatus into the exhaust pipe upstream of the muffler; and providing a passive apparatus operable to provide a second flow of water when the watercraft is moving through a body of water; and connecting the passive apparatus to the exhaust pipe upstream of the muffler.

31. The method of claim 30, wherein the step of providing a passive apparatus further comprises providing a conduit having an inlet end disposed in a forward facing portion of a stern drive of the watercraft and having an outlet end connected to the exhaust pipe.

32. The method of claim 30, wherein the step of providing a passive apparatus further comprises providing a conduit having an inlet end disposed in a forward facing surface of the watercraft below a water line and having an outlet end connected to the exhaust pipe.

33. The method of claim 32, further comprising the step of providing a funnel shaped opening on the inlet end.

34. The method of claim 33, further comprising the step of providing a check valve in the conduit, the check valve operable to pass fluid flowing into the exhaust pipe and to block fluid flowing out of the exhaust pipe from the conduit.

35. A kit for an exhaust apparatus of a watercraft, the watercraft having an engine cooling apparatus, the kit comprising:

an insert adapted to be installed in the exhaust apparatus of the watercraft, the insert comprising a first opening adapted for connection to an active engine cooling apparatus and a second opening for connection to a second supply of water; and passive means for supplying the second supply of water when the watercraft is moving through a body of water, connected to the second opening of the insert.

36. A watercraft comprising:

a hull;

an engine disposed within the hull;

an exhaust pipe attached to an exhaust manifold of the engine;

an engine cooling apparatus including a first fluid connection between the engine cooling apparatus and the exhaust pipe for directing a first flow of water into the exhaust pipe, the first flow of water driven by an active apparatus; and a second fluid connection between a supply of water exterior to the hull and the exhaust pipe for directing a second flow of water into the exhaust pipe, the second flow of water driven by a passive apparatus and is independent of the first flow of water.

37. The watercraft of claim 36 wherein the first fluid connection and the second fluid connection comprise an insert attached between the exhaust manifold and the exhaust pipe.

38. The watercraft of claim 36 further comprising a conduit having an opening disposed exterior to the hull below a water line in fluid communication with the second fluid connection.

39. The watercraft of claim 38 wherein the opening is funnel-shaped.

40. The watercraft of claim 36 further comprising a check valve connected in the second fluid connection and operable to pass fluid flowing into the exhaust pipe and to block fluid flowing out of the exhaust pipe from the second fluid connection.

41. The watercraft of claim 36 further comprising:

a stern drive apparatus connected to the engine and extending below an exterior bottom surface of the hull; and wherein the supply of water exterior to the hull is provided by an opening formed in a forward-facing surface of the stem drive apparatus at a point exterior to the hull and below a water line.

* * * * *

UNITED STATES PATENT AND TRADEMARK OFFICE
CERTIFICATE OF CORRECTION

PATENT NO. : 6,406,344 B1
DATED : June 18, 2002
INVENTOR(S) : Bland et al.

It is certified that error appears in the above-identified patent and that said Letters Patent is hereby corrected as shown below:

Column 6,
Line 46, delete "stem" and substitute therefor -- stern --.

Signed and Sealed this

Sixth Day of August, 2002

*Attest:*

*Attesting Officer*

JAMES E. ROGAN
*Director of the United States Patent and Trademark Office*